United States Patent [19]

Davids et al.

[11] Patent Number: 4,834,614
[45] Date of Patent: May 30, 1989

[54] SEGMENTAL VANE APPARATUS AND METHOD

[75] Inventors: Joseph Davids, Maitland; George J. Silvestri, Jr., Winter Park, both of Fla.

[73] Assignee: Westinghouse Electric Corp., Pittsburgh, Pa.

[21] Appl. No.: 268,139

[22] Filed: Nov. 7, 1988

[51] Int. Cl.$^4$ .......................... F01D 1/02; F01D 9/04
[52] U.S. Cl. .................................. 415/191; 415/209.4
[58] Field of Search ............... 415/191, 192, 193, 194, 415/195, 208, 209, 210, 216, 217

[56] References Cited

U.S. PATENT DOCUMENTS

| | | | |
|---|---|---|---|
| 1,187,448 | 6/1916 | De Wein . | |
| 1,187,451 | 6/1916 | Search . | |
| 1,398,461 | 11/1921 | Kerr . | |
| 2,110,679 | 3/1938 | Robinson | 253/77 |
| 2,350,125 | 5/1944 | Dahlstrand | 253/77 |
| 2,724,544 | 11/1955 | Hardigg | 230/132 |
| 2,808,228 | 10/1957 | Robinson | 253/77 |
| 4,445,259 | 5/1984 | Ekbom | 29/156.8 |
| 4,509,239 | 4/1985 | Lee et al. | 29/156.8 |

FOREIGN PATENT DOCUMENTS 954696 10/1947 France ............................ 415/193

Primary Examiner—Robert E. Garrett
Assistant Examiner—Michael V. Readey
Attorney, Agent, or Firm—K. Bach

[57] ABSTRACT

A segmented turbine vane nozzle assembly for a steam turbine has an inner ring and a plurality of vanes with each vane having a base end and a profile tip and a profile tip trailing edge extension portion and each vane base end being attached to the inner ring and extending radially therefrom. An annular outer ring has a plurality of arcuate grooves of predetermined depth therein. The outer ring is mounted concentrically with the inner ring. Each vane profile tip trailing edge extension portion extends into one outer ring arcuate groove. Each of the vane profile tips leading edge portion is attached to the outer ring so that a vane assembly is formed without welding the profile tip trailing edge of the vanes. This reduces flow leakage and the formation of erosion caused by the formation and release of large droplets. A method of making a segmented turbine vane nozzle assembly is also disclosed.

7 Claims, 2 Drawing Sheets

SEGMENTAL VANE APPARATUS AND METHOD

BACKGROUND OF THE INVENTION

The present invention relates to steam turbines and especially to the nozzles of a steam turbine and to the attachment of the nozzle vanes to the outer ring of the nozzle.

Steam turbines are used to transfer energy from heat, first to kinetic energy of a high velocity jetstream and then to the inner rotating shaft which is then usually employed for electrical power generation. A modern steam turbine typically has a number of stages, each stage having nozzles to change the heat energy to work energy and to direct the coarse of steam onto rotating blades. The fixed nozzles direct the steam onto the blades which form a rotating assembly (or rotor) which is rotated to change the kinetic energy of the jet of steam into shaft horsepower. The shaft or rotor rests on bearings and is closed in a cylindrical casing. The rotor is made to turn smoothly by means of the jets of steam issuing from the nozzles located around the periphery of the turbine cylinder and impinging upon the blades attached to the rotor. Stationary guide vanes function as a nozzle and the steam passes therethrough or is expanded and the velocity used for driving the blade ring. The alternating sequence of stationery nozzles and rotating blades is continued through each stage of the turbine.

The vanes in the nozzles of steam turbines are specifically shaped, and on some designs, typically the last few stages of the low pressure turbine are welded to an inner ring and to an outer ring. These welded vanes typically have profiled tips with trailing edges which edges are so thin that welding the vanes to the outer ring all the way along the profile tip of the vane can cause cracks in the trailing edges. The welding is therefore limited to the thicker portions of the end of the vane. This results in some leakage occurring around the trailing edge because it is not welded to the outer ring and this leads to reduced efficiency. Of greater importance are the vanes in steam turbine stages where the flow has a significant moisture content, where the water tends to collect on the pressure side of the vane and can flow around the unwelded portion of the vane tip and then re-enter the flow from the suction side as relatively large slow moving droplets. Because the droplets are large and slow moving, they have a greater impact. These droplets become a significant factor in the erosion of the turbine components.

The present invention is directed towards a design that prevents or reduces the formation and spill of droplets of moisture and reduces leakage without requiring the welding of the fragile trailing edge of the vanes in the nozzles. There have been in the past a number of methods for fabricating steam turbine diaphragms and rotors as well as nozzle assemblies. It has been suggested to remove portions in the inner ring or the outer ring or both the inner and outer ring for more securely locking bladed elements or nozzle vanes. These prior art devices are primarily directed towards securing blades to shroud ends in both stationary and rotatably turbine elements to more securely hold the blades or vanes to the rotor or the nozzle and are not designed to prevent or reduce the formation or spill of droplets around the trailing edge of nozzle vanes without requiring the welding of the fragile trailing edge of the vanes as in the present invention.

SUMMARY OF THE INVENTION

A segmented turbine vane nozzle assembly and a method of making a segmented turbine vane nozzle assembly are provided which do not require the welding of the fragile trailing edge of the vane and which reduces the formation or spill of droplets of moisture and which reduce flow leakage around the trailing edge of a vane. The nozzle has inner and outer rings and a plurality of vanes, each vane having a base and a profile tip. The outer ring has a plurality of arcuate grooves of predetermined depth therein and the outer ring is mounted concentrically with the inner ring and has each vane profile tip extending into one outer ring groove. Each of the vanes is attached at a distance from the profile tip to the edge of the outer ring. The vane is thus welded to the outer ring at a distance from the profile tip.

A method of making a segmented turbine blade nozzle assembly is provided including the steps of forming a plurality of vanes, each vane having a base and a profile tip, then forming an inner ring for supporting the plurality of vanes thereon. An outer annular ring is formed having a plurality of arcuate grooves on the inside thereof. Each vane profile tip of the plurality of vanes is positioned in one arcuate groove in the outer ring. Each vane is then attached to the outer ring by welding the vane at a distance from the end of the profile tip to the outer ring to thereby form a segmented turbine vane nozzle assembly without welding the profile tip of the vanes so as to reduce droplet formation as well as leakage and to increase the efficiency of the nozzle.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Figure 1:
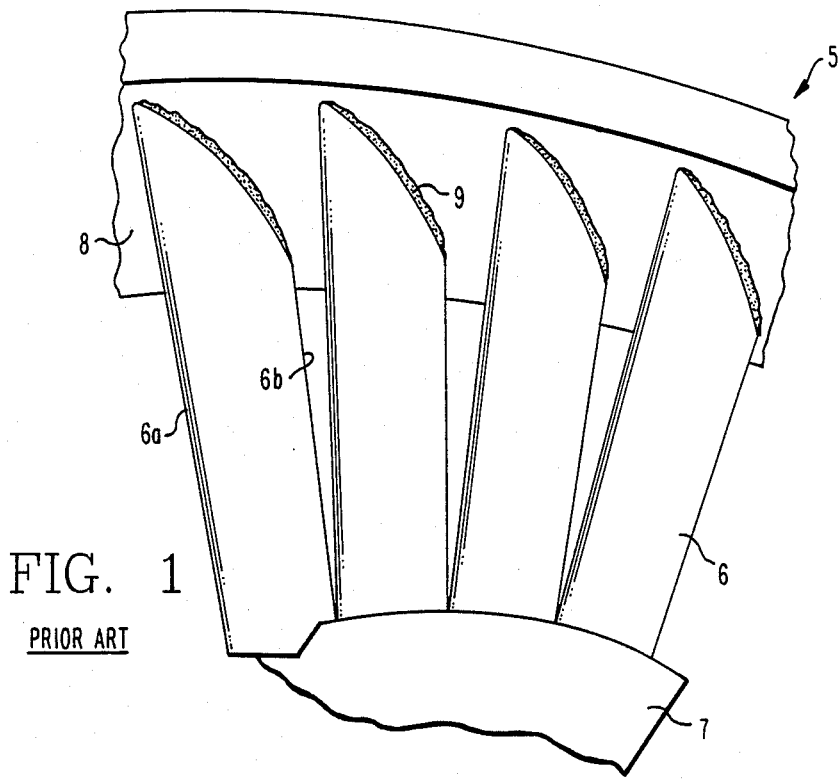
FIG. 1 is a partial perspective view of a steam turbine segmented vane nozzle.

Referring to FIG. 1 in the drawings, a portion of a segmented vane nozzle assembly 5 in accordance with the prior art is llustrated having a plurality of shaped vanes 6 attached at one end to an inner ring 7 at the base of the vane 6 and to an outer ring 8 adjacent a profile tip of the vane 6 with a weld 9 which welds either the entire profile tip or a portion thereof to the outer ring 8. In this conventional steam turbine arrangement, the trailing edges 6a of the vanes are so then that the welding 9 along the end of the vane can cause cracks in the trailing edges and welding is frequently limited to the thicker portions adjacent the leading edges 6b at the end of the vane. This causes two problems. First, leakage can occur around the trailing edge if it is not welded to the outer ring and this leads to reduced efficiency. Second, in the regions of the turbine where the flow has a significant moisture content, water collects on the pressure side of the vane and can flow around the unwelded portion of the vane tip and then re-enter the flow from the suction side as relatively large, slow moving droplets. Because the droplets are large and slow moving, they have greater impact and produce erosion of the turbine components.

Figure 4:
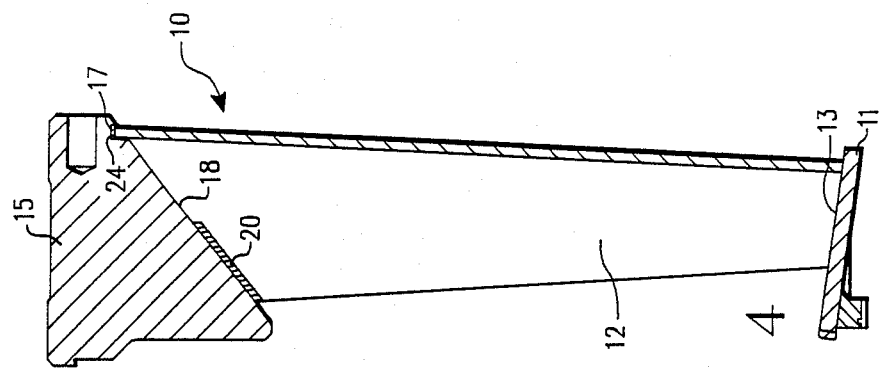
FIG. 4 is another sectional view taken through a steam turbine segmented vane nozzle.
Figure 3:
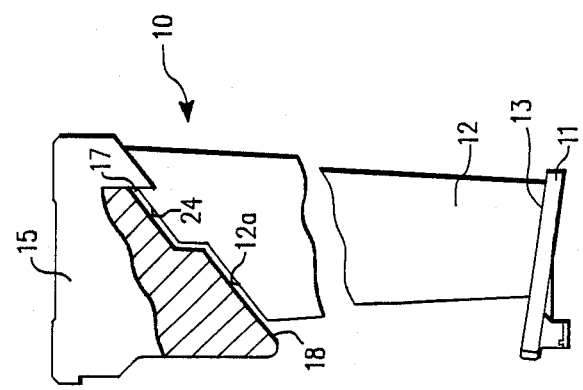
FIG. 3 is a sectional view taken through a steam turbine segmented vane nozzle.
Figure 2:
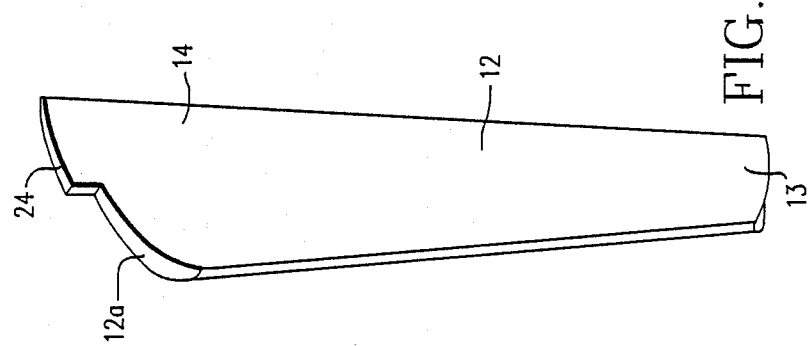
FIG. 2 is a partial perspective of a single vane in accordance with the present invention.

Referring to the drawings, FIGS. 2, 3 and 4, a section of a segmented vane nozzle assembly 10 is illustrated having an inner ring 11 attached to a base 13 of a shaped vane 12. Each vane 12 has a profile tip 14 at an end distal from base 13. Profile tip 14 includes a trailing edge profile tip extension 24 and a profile tip leading edge portion 12a attached to an outer ring 15. The outer ring 15 is an annular ring concentrically positioned relative to the axis of the inner ring 11 and has a plurality of arcuate grooves 17 cut thereinto along the inner surface 18 of the annular ring 15. The grooves 17 in the outer ring 15 are along the inner wall 18 to allow the profile tip extension 24 of each of the vanes 12 tips to protrude thereinto. Each side of each vane may be welded with welds 20 along a portion of the width of the vane along the area 22 of the vane which is spaced from the profile tip extension 24 protruding into the groove 17 so that the fragile trailing edge portion of the vane 12 is not welded directly to the outer ring 15. Since the trailing edges of the vanes are thin, welding is usually limited to the thicker portions. The welds 20 extend only over a portion of the vane.

In the conventional turbine nozzle, a weld also may not extend all the way across the blade and thereby permits leakage and large droplet formation across the unwelded region. The welding of the leading edge portion 12a of the tip of the blade with the profile tip extension 24 extending into the groove 17 reduces both leakage and droplet formation. As shown in the drawing, only the tip of the trailing edge of the vane 12 extends into a groove 17. The groove 17 with the profile tip of the vane therein reduces leakage which occurs around the trailing edge of the vane even though it is not welded to the outer ring since the leakage flow now has to negotiate a U-turn around the vane tip inside the groove as opposed to the straight path of the leakage in the conventional turbine tip welded directly to the outer ring. This increases the resistance to flow around the end of the vane and, because the amount of flow leakage is reduced, the amount of moisture available to form droplets is also reduced so that fewer large droplets are formed and, consequently, there is less erosion of the turbine components.

The invention as illustrated has the trailing edge extension 24 of the vane 12 extending into a groove 17 until the vane leading edge 12a abuts the surface 18 where this edge is not welded. The vane 12 trailing edge extension 24 is not welded to the outer ring 15 in the embodiment as shown. It should be clear that the reduction of erosion by the formation of larger droplets of water is one of the main purposes of the invention but that the efficiency is sufficient in the reduction of leakage to warrant its use in relatively dry flow environments.

Figure 5:
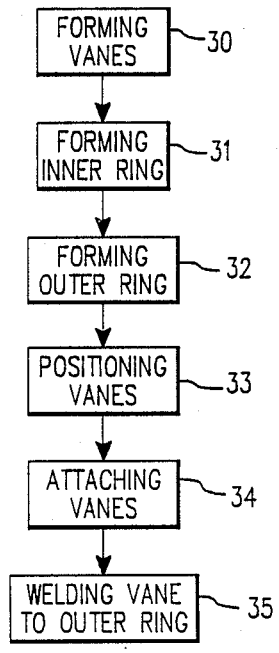
FIG. 5 is a flow diagram of the process in accordance with the present invention.

Referring to FIG. 5, a flow diagram of a process in accordance with the present invention is illustrated having a series of steps for making a segmented turbine vane nozzle assembly.

The steps include forming a plurality of vanes 12, block 30, each vane having a base and a profile tip and a tip extension portion, then forming an inner ring 11, block 31, for supporting the plurality of vanes thereon. Next forming of an annular outer ring 17, block 32, having a plurality of arcuate grooves on the inside thereof. The next steps are positioning each vane profile tip extension portion of the plurality of vanes 12 in an arcuate groove 17 in the outer ring 17, block 33, and attaching each vane 12 to the inner ring 11, block 34, and then welding each vane 12 to the outer ring 15 along a portion 12a of the trailing edge of each vane, block 35, so that a vane is formed without welding the profile tip extension 24 or the trailing edge of the vane to the outer ring to reduce droplet formation and flow leakage past the vane.

The present invention teaches both a method and an apparatus for erosion control within segmental vanes of steam turbine nozzles. It should, however, be clear that the present invention is not to be limited to the forms shown which are to be considered illustrative rather than restrictive.

I claim:

1. A method of making a segmented turbine vane nozzle assembly comprising the steps of:
    forming a plurality of vanes, each vane having a base and a profile tip having a trailing edge extension;
    forming an inner ring for supporting said plurality of vanes thereon;
    forming an annular outer ring having a plurality of arcuate grooves on the inside thereof;
    positioning the trailing edge extension of each vane profile tip of said plurality of vanes in one of said arcuate groove in said outer ring; and
    welding a leading edge portion of each said vane to said outer ring, whereby a vane assembly is formed without welding the profile tip extension of the vanes.

2. A method of making a segmented turbine vane nozzle assembly in accordance with claim 1 in which the step of forming an outer ring having a plurality of arcuate grooves on the inside includes the step of forming an annular outer ring with each groove having a generally rectangular cross-section.

3. A method of making a segmented turbine vane nozzle assembly in accordance with claim 1 in which the step of positioning the trailing edge portion of each vane profile tip extension of said plurality of vanes in one of said arcuate groove in said outer ring includes positioning each said vane profile tip extension to align the trailing edge thereof with the surface of said outer ring adjacent said arcuate groove.

4. A segmented turbine vane nozzle assembly for a steam turbine comprising:
    an inner ring;
    a plurality of vanes, each vane having a base end and a profile tip and a profile tip extension portion, each vane base end being attached to said inner ring and extending radially therefrom; and
    an annular outer ring having a plurality of arcuate grooves of predetermined depth therein, mounted concentrically of said inner ring and having each vane profile tip extension portion extending into one of said outer ring arcuate groove, each said vane being attached to said outer ring, adjacent a leading edge of the vane whereby a segmented vane nozzle assembly is formed without welding a portion of the trailing edge profile tip extension.

5. A segmented turbine vane nozzle assembly for a steam turbine in accordance with claim 4 in which each said annular outer ring arcuate groove has a generally rectangular cross-section.

6. A segmented turbine vane nozzle assembly for a steam turbine in accordance with claim 5 in which each said vane leading edge portion of said profile tip is welded along two sides thereof to a said outer ring.

7. A segmented turbine vane nozzle assembly for a steam turbine in accordance with claim 6 in which said vane profile tip extension portion extends into one of said outer ring arcuate groove to a point where the leading edge of the profile tip aligns with the surface of the outer ring inner wall.

* * * * *